(12) United States Patent
Nelson et al.

(10) Patent No.: US 8,671,036 B2
(45) Date of Patent: Mar. 11, 2014

(54) USER INTERFACE FOR DEFINING ACCOUNT DIMENSION COMBINATIONS

(75) Inventors: Kimberly A. Nelson, Fargo, ND (US); William L. Frandsen, Fargo, ND (US); Crystal Gilson, Fargo, ND (US); Kevin M. Honeyman, Fargo, ND (US); David J. Lannoye, Fargo, ND (US); Karen D. Mullenberg, Horace, ND (US)

(73) Assignee: Microsoft Corporation, Redmond, WA (US)

( * ) Notice: Subject to any disclaimer, the term of this patent is extended or adjusted under 35 U.S.C. 154(b) by 388 days.

(21) Appl. No.: 12/613,912

(22) Filed: Nov. 6, 2009

(65) Prior Publication Data

US 2011/0112939 A1 May 12, 2011

(51) Int. Cl.
*G07B 17/00* (2006.01)
*G06Q 40/00* (2012.01)

(52) U.S. Cl.
USPC ............... 705/30; 705/35; 715/777; 715/853

(58) Field of Classification Search
None
See application file for complete search history.

(56) References Cited

U.S. PATENT DOCUMENTS

| | | | | |
|---|---|---|---|---|
| 5,696,906 A * | 12/1997 | Peters et al. | | 705/34 |
| 5,884,284 A * | 3/1999 | Peters et al. | | 705/30 |
| 7,580,916 B2 | 8/2009 | Nelson et al. | | |
| 8,190,469 B2 * | 5/2012 | Derasmo et al. | | 705/13 |
| 2003/0033225 A1 | 2/2003 | Meldahl | | |
| 2003/0158798 A1 * | 8/2003 | Green | | 705/30 |
| 2005/0021597 A1 * | 1/2005 | Derasmo et al. | | 709/201 |
| 2005/0055289 A1 * | 3/2005 | Mehldahl | | 705/30 |
| 2005/0216378 A1 | 9/2005 | Bickel et al. | | |
| 2006/0190397 A1 | 8/2006 | Lindemann et al. | | |
| 2006/0224473 A1 | 10/2006 | Nelson et al. | | |
| 2007/0130032 A1 | 6/2007 | Nelson et al. | | |
| 2007/0136155 A1 * | 6/2007 | Chape et al. | | 705/30 |
| 2008/0319780 A1 | 12/2008 | Hellyer et al. | | |
| 2010/0100468 A1 * | 4/2010 | Spector et al. | | 705/35 |

FOREIGN PATENT DOCUMENTS

WO    WO2005055491    *    6/2005

OTHER PUBLICATIONS

"Financial Management", retrieved at <<http://www.m4systems.com/dynamics_gp_financial_management.aspx>>, Sep. 30, 2009, pp. 4.
Simon, Gary, "SAS Financial Management", retrieved at <<http://www.sas.com/offices/europe/uk/solutions/finmgmt/pdf/finmgt_productreview.pdf>>, Mar. 2006, pp. 8.
Sewell, et al., "Oracle eBusiness Suite Primer for PeopleSoft Users/Implementers", retrieved at <<http://www.rhaptech.com/doc/Oracle_eBusiness_Suite_Primer_for_PeopleSoft_Users_and_Implementers.pdf>>, Sep. 30, 2009, pp. 35.
"International Search Report", Mailed Date: May 31, 2011, Application No. PCT/US2010/051986, Filed Date: Oct. 8, 2010, pp. 8. (MS# 327998.02).

* cited by examiner

*Primary Examiner* — Mussa A Shaawat
(74) *Attorney, Agent, or Firm* — Damon Rieth; Leonard Smith; Micky Minhas

(57) ABSTRACT

A user interface is provided enabling users to build and modify account structures with various account-dimension combinations and rules for those combinations. The user interface provides context for the account structure and controls for creation and modification of the account configurations.

20 Claims, 11 Drawing Sheets

USER INTERFACE FOR DEFINING ACCOUNT DIMENSION COMBINATIONS

BACKGROUND

Business solutions applications provide a large number of powerful tools addressing many aspects of businesses and other organizations. A majority of such applications provide integrated capabilities for financial management, distribution, manufacturing, project accounting, human resource management, field service management, business analytics, and comparable areas. An important aspect of these applications is providing automated business accounting functions.

To track and maintain financial information in an organization, financial professionals set up a chart of accounts, which is a collection of accounts that define a financial framework. To further track the transactions in these accounts, dimensions are added to the accounts. A dimension is essentially a variable that contains additional information associated with a transaction. The dimensions may be used to classify, report, and analyze financial transactions based on specific business needs. Dimensions may include department, cost center, profit center, region, purpose, and similar aspects of tracked transactions.

The relationship of the dimensions with the main accounts and with other dimensions, as well as how transactions can be entered against an account structure are controlled by rules, which may be set up by an administrator or users with varying permission levels. For example, a manager may define accounts and dimensions for his/her department. The configuration of the account and dimension combinations is typically spread across multiple aspects of applications. Thus, creation of valid account and dimension combinations using existing accounting tools may be a challenging task.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to enabling users to build and modify account structures comprising various account-dimension combinations and rules for those combinations. According to some embodiments, a user interface enables the users to accomplish the tasks through a single view user interface that provides context for the account structure and controls for creation and modification of the account configurations.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
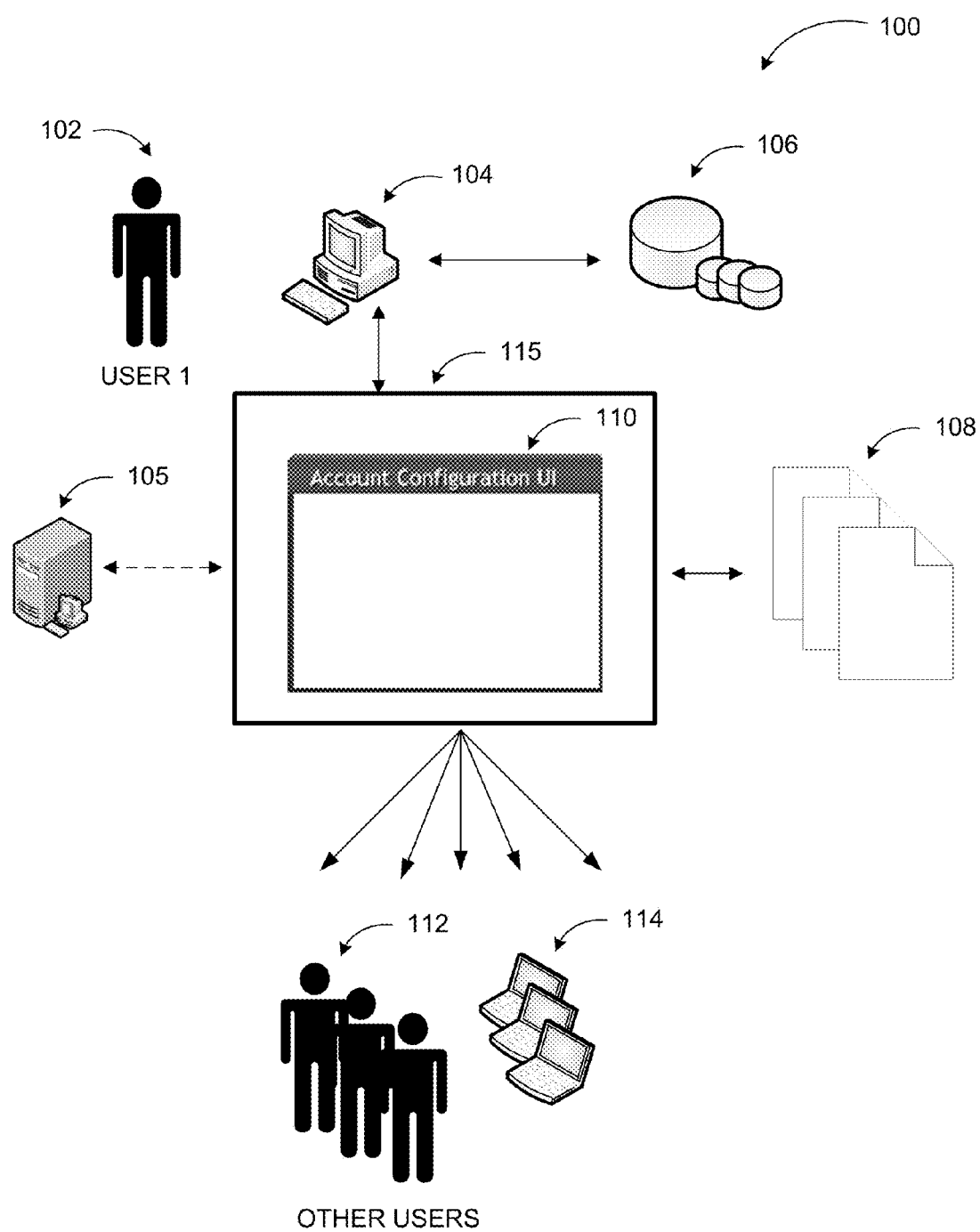
FIG. 1 is a conceptual diagram illustrating major elements associated with an account structure configuration user interface according to embodiments.

As briefly described above, users are enabled to build and modify account structures with various account-dimension combinations and rules for those combinations through a single view user interface that provides context for the account structure and controls for creation and modification of the account configurations. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media. The computer program product may also be a propagated signal on a carrier (e.g. a frequency or phase modulated signal) or medium readable by a computing system and encoding a computer program of instructions for executing a computer process.

Throughout this specification, the term "platform" may be a combination of software and hardware components for providing various computing services such as business applications. Examples of platforms include, but are not limited to, a hosted service executed over a plurality of servers, an application executed on a single server, and comparable systems. The term "server" refers to a computing device executing one or more software programs typically in a networked environment. The term "client" refers to a computing device or software application that provides a user access to data and other software applications through a network connection with other clients and/or servers. More detail on these technologies and example operations is provided below.

FIG. 1 includes conceptual diagram 100 illustrating major elements associated with an account structure configuration user interface according to embodiments. At the core of the elements shown in diagram 100 is financial system 115 that may be implemented in the specific context of a software application. Financial system 115 may be a stand-alone financial record keeping (or accounting) system, or it can be a financial module of a larger system, such as an enterprise resource planning (ERP) system. As such, financial system 115 may be executed by standalone computer 104 or by server 105 and accessed by computer 104.

Financial system 115 may include or interact with a number of components such as a general ledger consisting of a series of transactions stored on one or more suitable storage devices and a plurality of sub-ledgers that may track specific items such as cash, accounts receivable, accounts payable, payroll, inventory and the like. All entries posted to sub-ledgers 104 may transact through general ledger.

Financial system 115 may support user-definable transaction dimensions for tracking and business analytics. A user-definable transaction dimension is similar to a variable that contains additional information relative to a transaction. These user-definable transaction dimensions are used to classify, report, and analyze financial transactions based upon a user's specific business needs. A number of transaction dimensions that can be defined by a user may be unlimited and include such dimensions as cost center, profit center, region, hours, and comparable ones, as well as predefined system transaction dimensions such as customer, vendor, item, site, and similar ones. These user-defined transaction dimension codes may be attached to ledger transactions eliminating a need to analyze the transactions based on account segments.

Financial system 115 may also provide a relational chart of accounts through account configuration user interface (UI) 110 that includes a listing of accounts associated with the general ledger. Relational chart of accounts provides one or more dimensions associated with each account. Some accounts may be listed in multiple instances with different dimension combinations.

In a system according to embodiments, a user (e.g. user 102) may be enabled to add, remove, or otherwise edit dimension settings within the financial system 115 by editing relational chart of accounts through the account configuration UI 110 as discussed in more detail below. In configuring accounts and account dimensions, user 102 may utilize data stored in external data stores such as data stores 106. Financial system 115 may generate reports and other analysis tools and results (e.g. documents 108) based on the configured accounts automatically or upon request. Accounts configured by user 102 may become published and available to other users 112 accessing the system through computing devices 114. Other users 112 may also be enabled to configure/modify account dimensions and combinations through account configuration UI 110.

Figure 2:
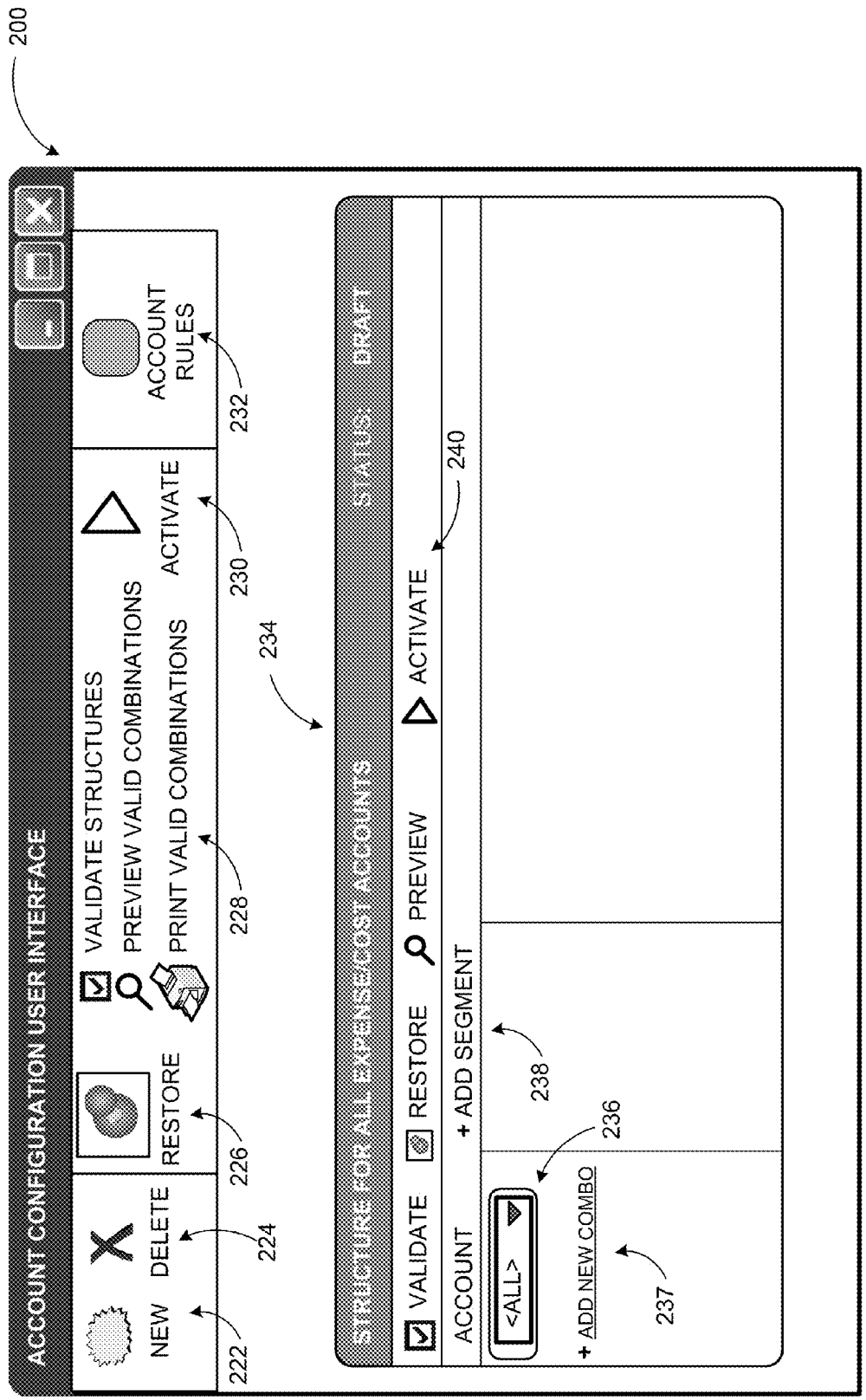
FIG. 2 illustrates a user interface according to embodiments along with example controls.

FIG. 2 illustrates user interface 200 according to embodiments along with example controls. As mentioned previously, financial professionals set up a chart of accounts defining a financial framework to track and maintain financial information in an organization. Dimensions are added to the main accounts to further track the transactions in these accounts. How these dimensions are attached to the main accounts as well as other dimensions and how transactions can be entered against an account structure are controlled by rules, all of which a user can set up.

A relational chart of accounts uses an account structure that requires the user to set up valid accounts and dimension codes and then use rules to specify how the accounts and dimensions will come together to create account structures. The number of combinations may be relatively large, and users need to set up valid combinations so that data entry is accurate. In many settings, this set-up can be so complex that information technology (IT) professionals perform the set-up instead of the people who have a better understanding of how to manage a business' financials—the financial professionals. An account configuration UI according to embodiments reduces this complexity and allows users to define an account, define dimensions, combine the dimensions with the accounts, and set rules for when those combinations are valid in a single view.

Account configuration UI 200 presents the relational account structure as a combination of a table and a tree structure. Under a main account, new accounts may be added as a new combination (237). The accounts may be displayed as rows related in a tree structure reflecting a hierarchic relationship of the accounts and sub-accounts. Each account combo may include a number of dimensions. The dimensions may be added as segments (238) and displayed as columns. Various account hierarchies may be expanded or collapsed for viewing simplicity.

Account configuration UI 200 also presents a number of controls for performing actions associated with the relational account structure and its elements. Example controls may include an icon for opening a new account structure (226), an icon for deleting an account structure/account/segment (224), an icon for restoring a deleted element (226), icons for validating account structures (against stored rules)/previewing valid combinations/printing valid combinations (228), an icon for activating an account structure (230) such that it can be published and made available to other users, an icon for accessing/editing account rules (232), and comparable ones. Of course, any of these controls may be provided in textual form (e.g. a drop down menu) or a combination of textual and graphical forms.

Within the account configuration UI 200, one or more account structures may be displayed and edited in separate windows or under separate tabs. Each account structure may be identified along with its status by window header 234 (or tab header). The status may be draft (a user is working on the structure), active (released for use by other users), or similar. Each window may include additional controls 240 as well as elements to add new accounts/dimensions as discussed above. The tree structure may be presented in a collapsible list (236).

Figure 3:
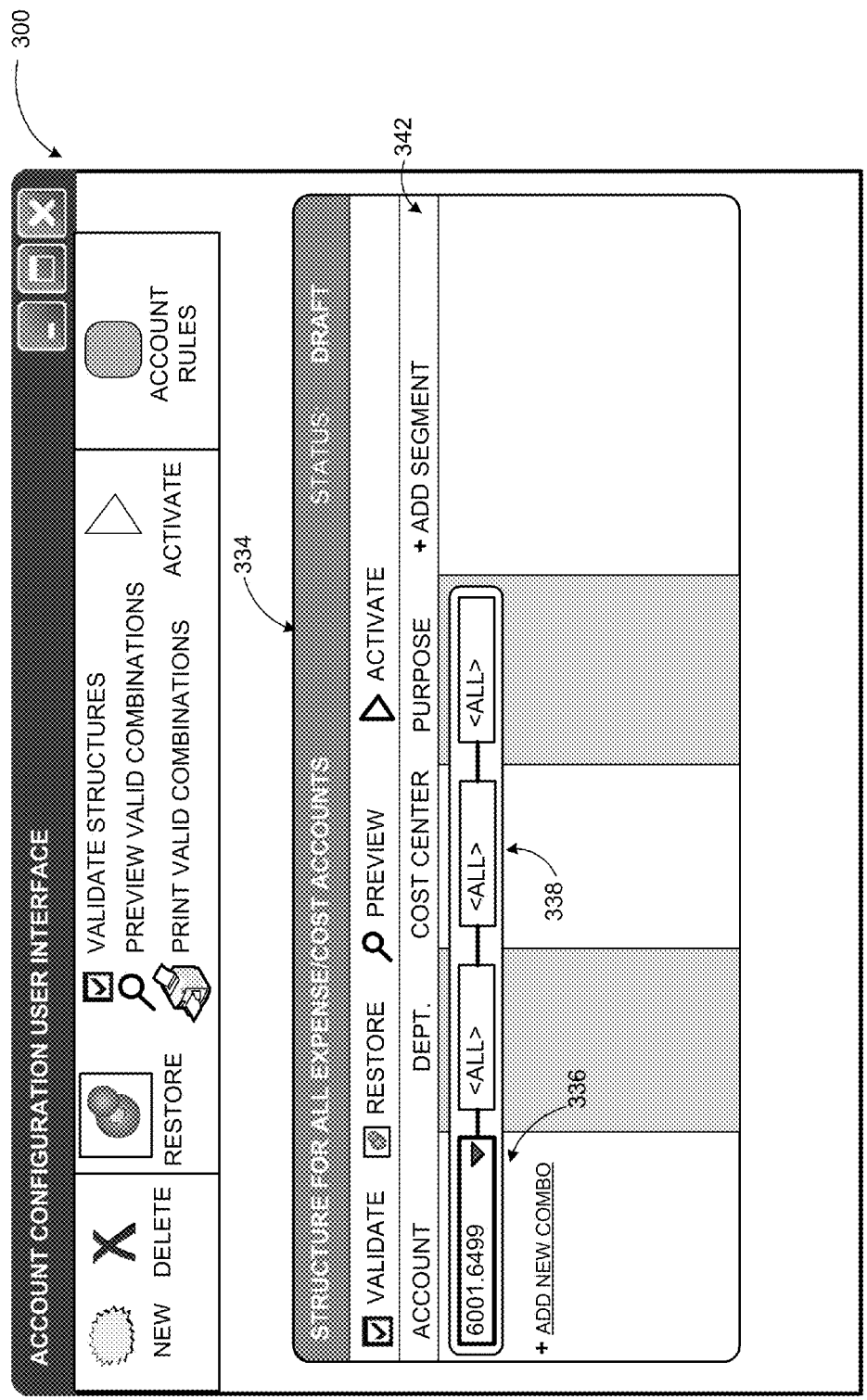
FIG. 3 illustrates how new combinations may be added to an account in the user interface of FIG. 2.

FIG. 3 illustrates how new combinations may be added to an account in the user interface of FIG. 2. Account configuration UI 300 includes similar controls as discussed previously. The account structure window header 334 indicates that the structure is for all expense/cost accounts and it is being worked on by a user. An example account 336 (6001.6499) with its three example dimensions (department, cost center, purpose) is shown in the account structure. The account and its dimensions appear across one row 338. Each segment (dimension) within the structure has its own column, and any related controls, such as the "add new combination" function, moves with the focus, giving a user visual affordance into how the structure can be further configured. The dimensions are identified in the column header row 342.

A number of textual and graphical schemes may be utilized in an account configuration UI according to embodiments to enhance user experience. For example, individual columns may be distinguished through a coloring scheme or an alternating shading scheme. As shown in the figure, the account number is highlighted with bold font and a darker outline indicating the user's current focus. Other schemes may also be implemented. Further examples are discussed below.

Figure 4:
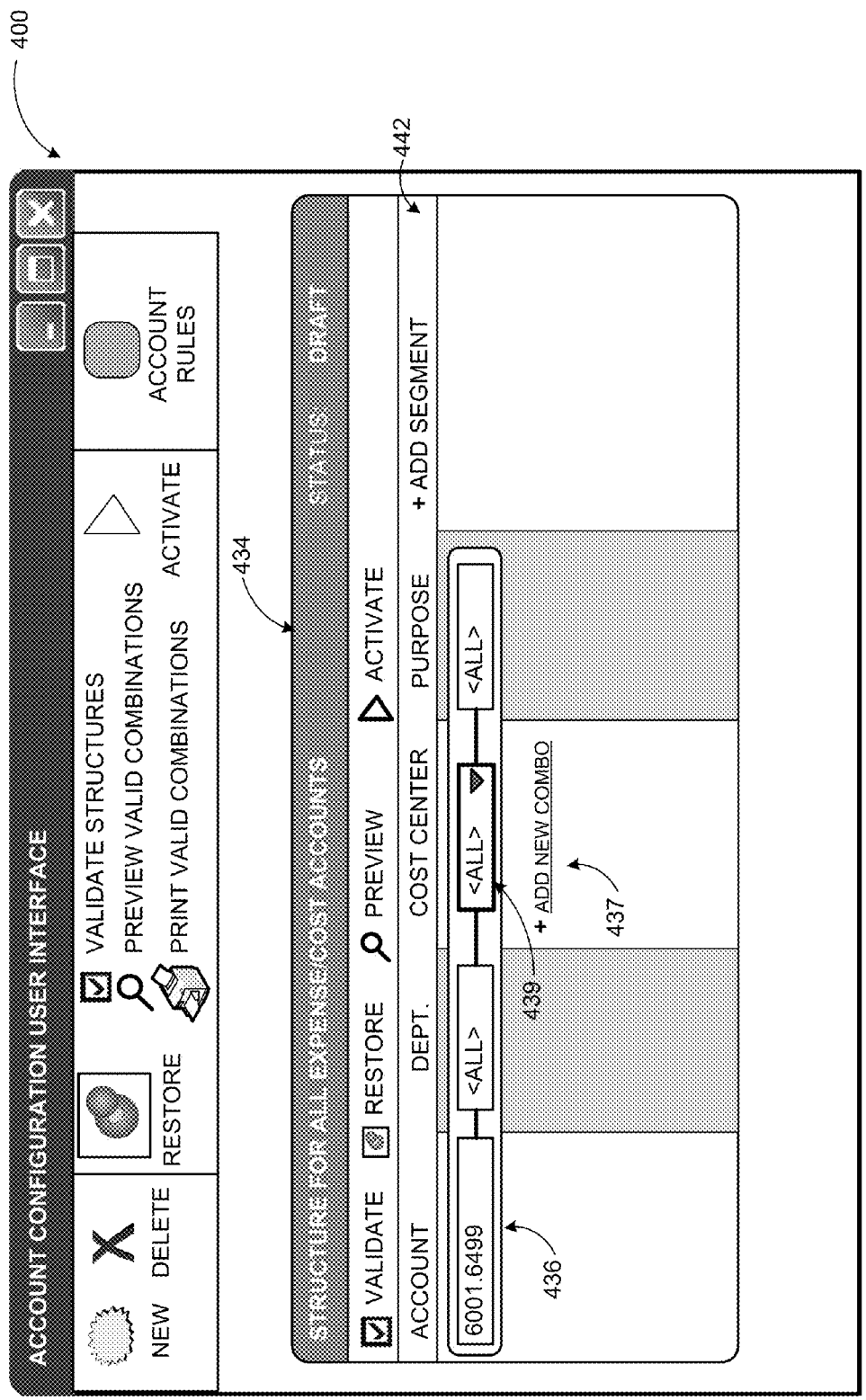
FIG. 4 illustrates how individual dimensions of a combination may be focused on and modified/set up in the user interface of FIG. 2.

FIG. 4 illustrates how individual dimensions of a combination may be focused on and modified/set up in the user interface of FIG. 2. Account configuration UI 400 includes similar controls as discussed previously. Account structure window header 434 and column headers row 442 are also similar to those in FIG. 3.

Differently from the UI of FIG. 3, the user's focus in this example scenario has shifted to the cost center dimension 439 of account 6001.6499 (436). This shift is indicated by the highlighting of cost center dimension with the darker outline box. Additionally, the "add new combination" function 437 has also shifted to the cost center column giving the user visual affordance into how the structure can be further configured.

Figure 5:
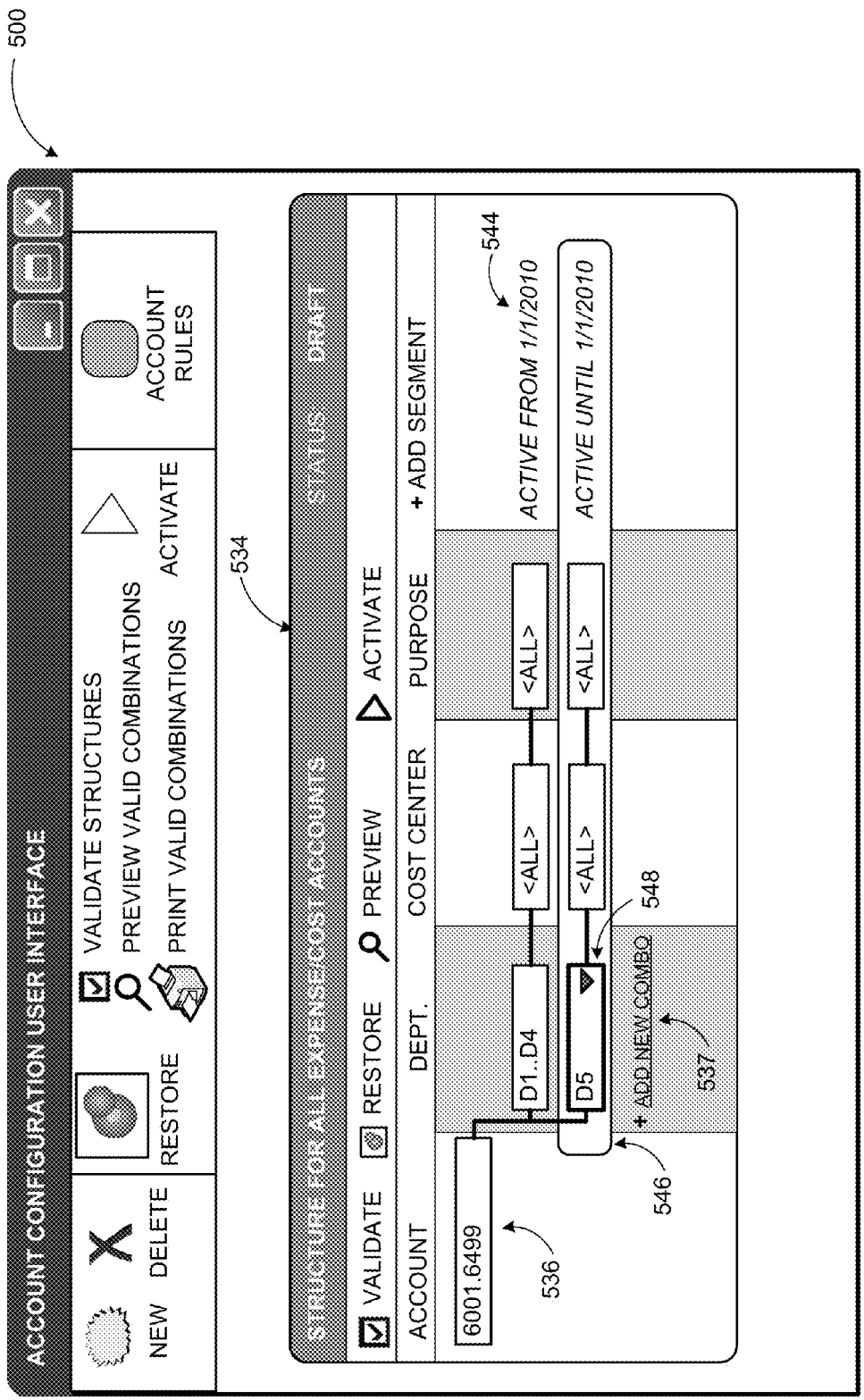
FIG. 5 illustrates how a hierarchical structure may be formed from a flat structure reflecting relationships between the main account and different combinations.

FIG. 5 illustrates how a hierarchical structure may be formed from a flat structure reflecting relationships between the main account and different combinations. Account configuration UI 500 includes similar controls as discussed previously. Account structure window header 534 is also similar to those in FIG. 3 and FIG. 4.

In addition to providing that single view into the configuration, account configuration UI 500 also provides visual feedback to the user while the configuration takes place—a flat cell structure (like the one discussed above) becomes more hierarchical as combinations are being created. Hierarchical parent-child relationship between one main account 536 and two different combinations of dimensions is displayed graphically through the connection lines. A currently focused combination is highlighted through an outline box 546. The user's focus is further on the department dimension of the second combination. As shown previously, this focus is indicated by the darkened outline box 548. Moreover, the "add new combination" function 537 is in the same column as the user's focus.

Each segment is presented in its own row providing a vertical distinction as the configuration becomes more complex. The structure may be configured as complex as the user wishes, but the visual model of that complexity remains streamlined. Further, scrolling vertical and horizontal bars may be provided (not shown) enabling the structure to include as many segments (horizontal) and combinations (vertical) as the user desires.

Additional information may also be provided on the account structure UI 500. For example, an active range of each combination (544) may be displayed next to each row of combinations enabling the user to adjust individual dimensions or other parameters with the additional knowledge.

Figure 6:
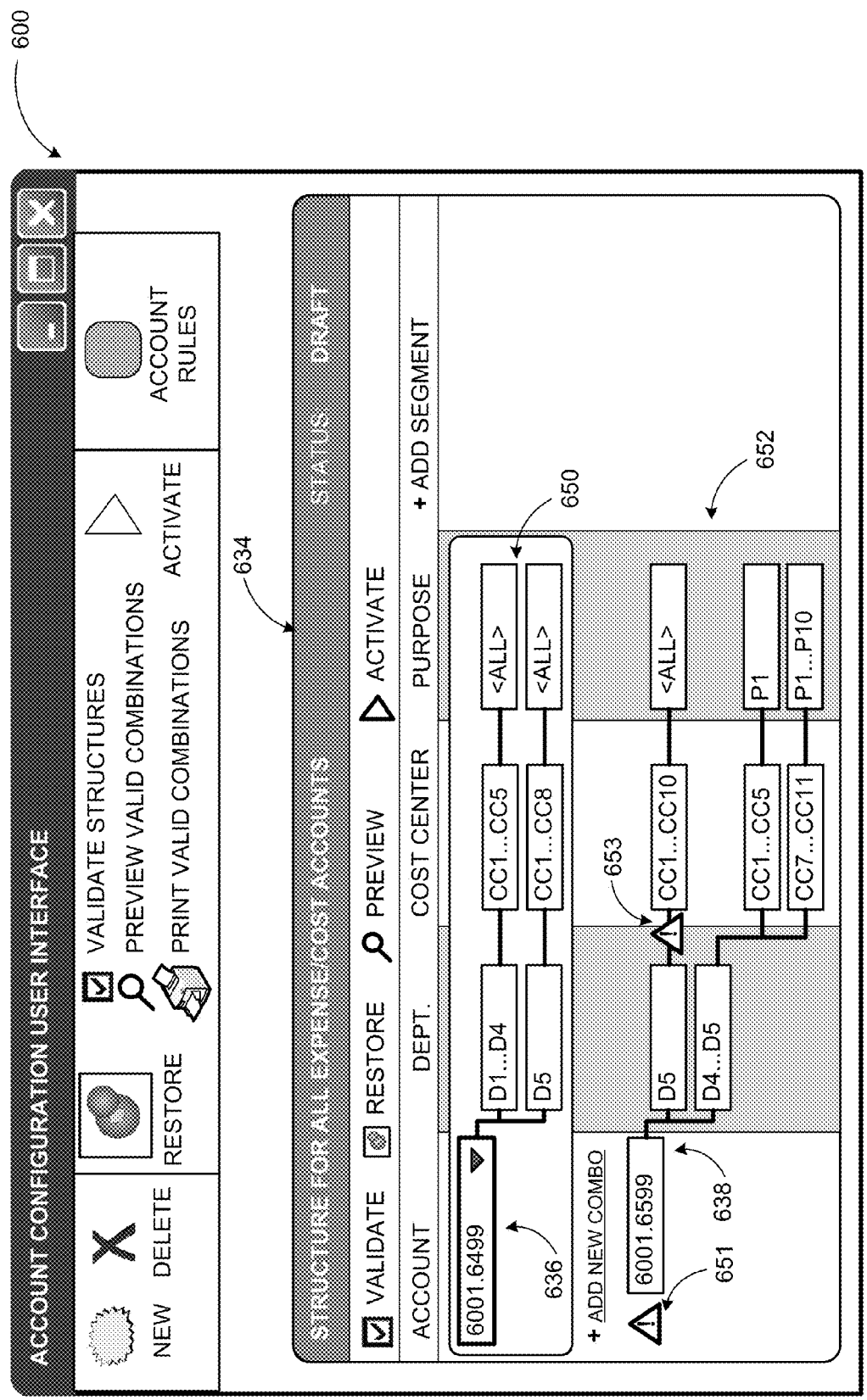
FIG. 6 illustrates presentation of multiple account structures and feedback on validity of combinations in the user interface of FIG. 2.

FIG. 6 illustrates presentation of multiple account structures and feedback on validity of combinations in the user interface of FIG. 2. Account configuration UI 600 includes similar controls as discussed previously. Account structure window header 634 is also similar to those in FIG. 3, FIG. 4, and FIG. 5.

Two accounts (636 and 638) are displayed along with their hierarchical combinations. Furthermore, the department dimension of the second account 638 has two dimension combinations as its children. The parent child relationships are graphically presented as combination structures 650 and 652 across multiple rows and columns.

Current focus of the user is on the first account 636. Thus that account combination is highlighted with the outline box and the outline box around the account number is darker to indicate that. Additionally, the "add new combination" function is next to the account identifier. As discussed previously, additional information may be provided to the user associated with various aspects of the account structure(s). In this example UI, alert indicators 651 and 653 illustrate how a user may be alerted to account rule violations. For example, alert indicator 653 points out that the first dimension combination associated with department D5 for the second account 638 violates an account rule. A similar alert is displayed next to the second account 638 indicating that there is at least one rule violation in the account structure. Other forms of indicators, textual and/or graphical, may be employed to provide alerts to the user regarding account structure problems.

Figure 7:
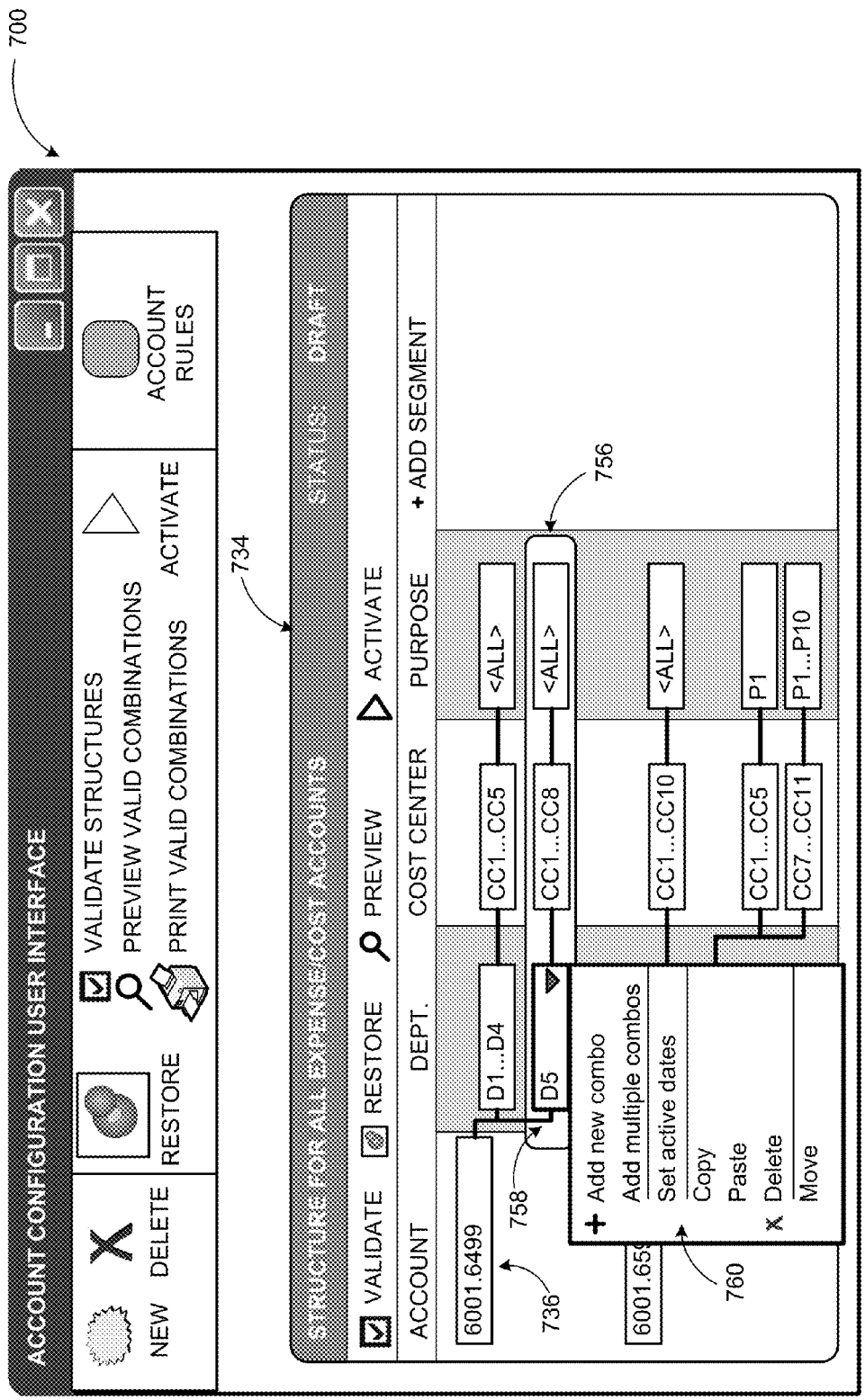
FIG. 7 illustrates how additional functionality may be provided upon selection of an element of the account structure in the user interface of FIG. 2.

FIG. 7 illustrates how additional functionality may be provided upon selection of an element of the account structure in the user interface of FIG. 2. Account configuration UI 700 includes similar controls as discussed previously. Account structure window header 734 is also similar to those in previous figures.

Two account structures are displayed again with the current focus being on department dimension 758 of the first account 736 placing the highlight indicators on that dimension and the combination including that dimension (756). In addition to the controls provided at the top of the account configuration UI 700 and at the top of the account structure window, a pop-up menu of controls 760 may be provided next to the focused element. The pop-up menu of controls 760 may include textual and/or graphical menu items such as "add new combination", "add multiple combinations", "set active dates", and the like.

Individual elements (segments, combinations, etc.) may also be modified, created, deleted using standard functions such as copy, paste, delete, or move. Thus, an account configuration UI according to embodiments enables the user to set up and modify account structures in a graphical manner. The user is offered one place to not only view an entire chart of accounts configuration but also insight to how the chart of accounts was set up and ultimately behaves. The displayed structure serves as a list of accounts, a list of dimensions, and a list of rules with a view into how they are related and work together.

Figure 8:
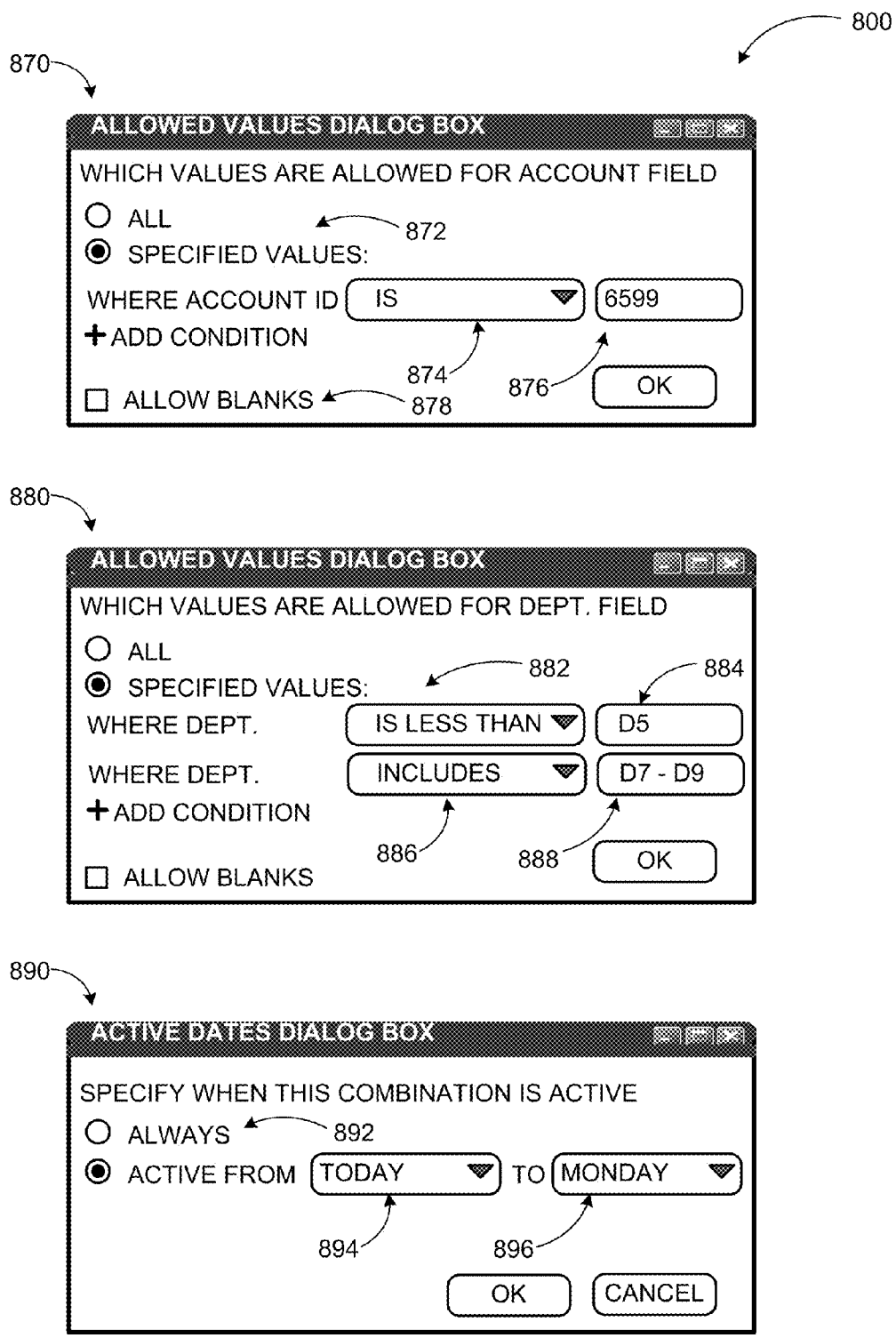
FIG. 8 illustrates example dialog boxes that may be used to define account and dimension properties in association with a user interface according to embodiments.

FIG. 8 illustrates example dialog boxes that may be used to define account and dimension properties in association with a user interface according to embodiments. During the configuration process, individual data entry windows may be utilized to enable the user input more detailed information. Diagram 800 shows three such example dialog boxes.

First dialog box 870 is for specifying allowed values. The user may have activated this dialog box upon focusing on the account field, which is indicated at the top of the dialog box. Dialog box 870 provides the user the option to allow all values or specified values (872). A condition such as "where the account ID is 6599" may be defined by selecting among condition types 874 and the fields 876 to which the condition applies. Other selectable options such as allowing blank values 878 may also be provided.

Dialog box 880 is another example for specifying allowed values. In this example, the applicable segment in this case is the department field. Differently from the example of dialog box 870, two separate conditions are defined: "where department is less than D5" (selections 882 and 884) and "where department includes D7-D9" (selections 886 and 888).

Dialog box 890 is for selecting active dates. One option provided to the user is selecting "always" (892). Alternatively, the user may specify a date range by selecting a beginning date 894 and an end date 896.

While embodiments have been discussed above using a general framework and specific examples, they are intended to provide a general guideline to be used for describing a user interface for defining account dimension combinations. Other embodiments may be implemented with different textual and graphical elements, combinations, and configurations using the principles described herein. Thus, embodiments are not limited to the example systems, components, elements, and graphical aspects, and configurations discussed in FIG. 2 through FIG. 8, and can be implemented with other elements and configurations.

It should also be noted that the systems and configurations discussed above are simplified for illustrations purposes and not exhaustive in scope. For example, many financial systems may also include revenue, expense, and/or capital withdrawal accounts in the form of temporary accounts that are reset at the end of an accounting period so that they have zero balances at the start of the following period (commonly one year). Embodiments may be implemented with similar elements, accounts, account dimensions, rules, and other configurations using the principles described herein.

Figure 9:
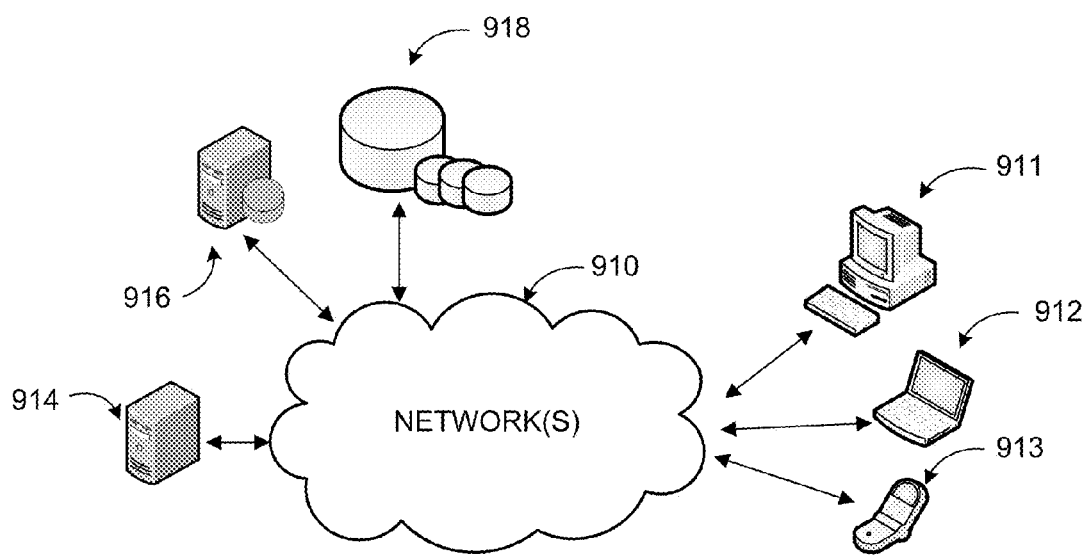
FIG. 9 is a networked environment, where a system according to embodiments may be implemented.

FIG. 9 is an example networked environment, where embodiments may be implemented. A platform providing a user interface for building and modifying account structures may be implemented via software executed over one or more servers (e.g. server 914) such as a hosted service. The platform may communicate with applications on individual computing devices such as a desktop computer 911, laptop computer 912, and smart phone 913 ('client devices') through network(s) 910.

Client devices 911-913 are capable of communicating through a variety of modes and exchange documents. A business application executed in one of the client devices or one of the servers (e.g. server 914) may store and retrieve data associated with the user requested tasks through the user interface to and from a number of sources such as data stores 918, which may be managed by any one of the servers or by database server 916.

Network(s) 910 may comprise any topology of servers, clients, Internet service providers, and communication media. A system according to embodiments may have a static or dynamic topology. Network(s) 910 may include a secure network such as an enterprise network, an unsecure network such as a wireless open network, or the Internet. Network(s) 910 may also comprise a plurality of distinct networks. Network(s) 910 provides communication between the nodes described herein. By way of example, and not limitation, network(s) 910 may include wireless media such as acoustic, RF, infrared and other wireless media.

Many other configurations of computing devices, applications, data sources, and data distribution systems may be employed to implement a system providing an account structure creation and modification user interface. Furthermore, the networked environments discussed in FIG. 9 are for illustration purposes only. Embodiments are not limited to the example applications, modules, or processes.

Figure 10:
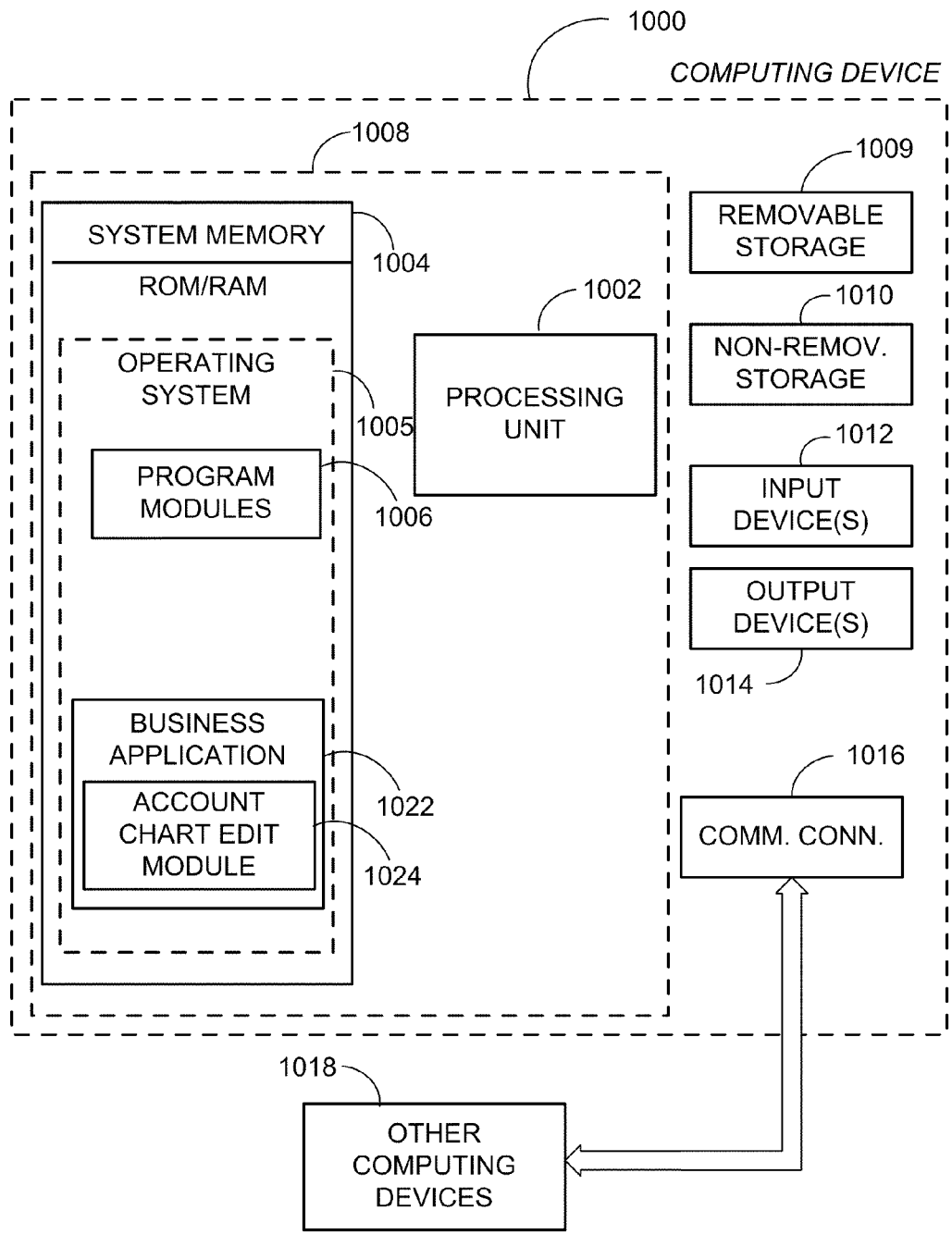
FIG. 10 is a block diagram of an example computing operating environment, where an account structure user interface according to embodiments may be provided.

FIG. 10 and the associated discussion are intended to provide a brief, general description of a suitable computing environment in which embodiments may be implemented. With reference to FIG. 10, a block diagram of an example computing operating environment for an application according to embodiments is illustrated, such as computer 1000. In a basic configuration, computer 1000 may include at least one processing unit 1002 and system memory 1004. Computer 1000 may also include a plurality of processing units that cooperate in executing programs. Depending on the exact configuration and type of computing device, the system memory 1004 may be volatile (such as RAM), non-volatile (such as ROM, flash memory, etc.) or some combination of the two. System memory 1004 typically includes an operating system 1005 suitable for controlling the operation of the platform, such as the WINDOWS® operating systems from MICROSOFT CORPORATION of Redmond, Wash. The system memory 1004 may also include one or more software applications such as program modules 1006, business application 1022, and account chart edit module 1024.

Business application 1022 may be an application or an integral part of a hosted service. Business application 1022 performs operations associated with classification, reporting, analysis of financial transactions, and similar tasks. Account chart edit module 1024 may be a separate application or an integral module of business application 1022. Account chart edit module 1024 may, among other things, provide a user interface as discussed in more detail above. This basic configuration is illustrated in FIG. 10 by those components within dashed line 1008.

Computer 1000 may have additional features or functionality. For example, the computer 1000 may also include additional data storage devices (removable and/or non-removable) such as, for example, magnetic disks, optical disks, or tape. Such additional storage is illustrated in FIG. 10 by removable storage 1009 and non-removable storage 1010. Computer readable storage media may include volatile and nonvolatile, removable and non-removable media implemented in any method or technology for storage of information, such as computer readable instructions, data structures, program modules, or other data. System memory 1004, removable storage 1009 and non-removable storage 1010 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computer 1000. Any such computer readable storage media may be part of computer 1000. Computer 1000 may also have input device(s) 1012 such as keyboard, mouse, pen, voice input device, touch input device, and comparable input devices. Output device(s) 1014 such as a display, speakers, printer, and other types of output devices may also be included. An interactive display may act both as an input device and output device. These devices are well known in the art and need not be discussed at length here.

Computer 1000 may also contain communication connections 1016 that allow the device to communicate with other devices 1018, such as over a wireless network in a distributed computing environment, a satellite link, a cellular link, and comparable mechanisms. Other devices 1018 may include computer device(s) that execute other applications. Communication connection(s) 1016 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 11:
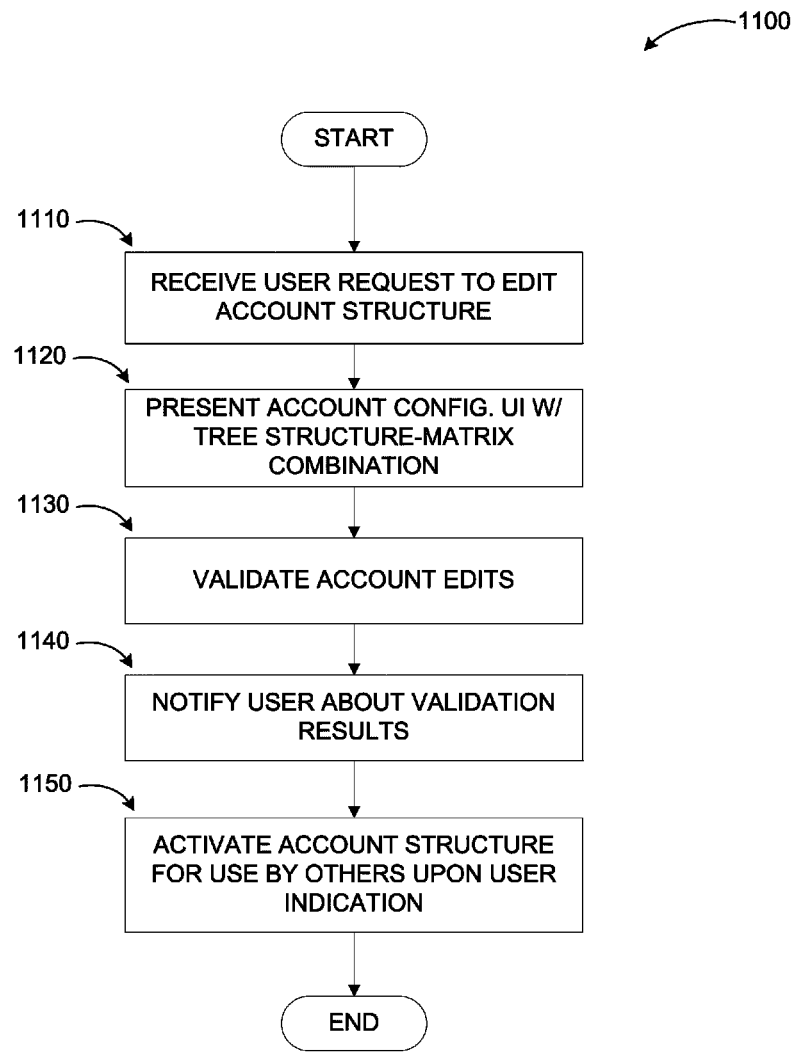
FIG. 11 illustrates a logic flow diagram for a process of providing a user interface for building and modifying account structures according to embodiments.

FIG. 11 illustrates a logic flow diagram for a process 1100 of providing a user interface for account structure creation and modification according to embodiments. Process 1100 may be implemented by any business application.

Process 1100 begins with operation 1110, where a user request for editing an account structure is received. In response to the request, the account configuration UI is presented at operation 1120 with the account structures being displayed employing a combination of tree structure and matrix formats. Using these formats, the dimension combinations are displayed as rows with dimensions of same type being aligned in a column. Moreover, a graphical scheme may also be employed such that a parent-child relationship between the account and the associated plurality of dimension combinations is visually presented to the user in a visually coherent manner.

Individual account structures may be displayed in separate windows or tab views along with textual and/or graphical controls for editing the account structures. The controls may be provided as part of the account configuration UI, as part of individual windows or tab views, or as additional elements such as pop-up menus. A color scheme, a shading scheme, and/or a textual style scheme may be used to indicate an element of the account structure currently being focused on by the user. Presentation of the controls for editing account structure elements may be modified based on an element of the account structure currently being focused on by the user. For example, some of the controls may be repositioned based on an account structure element currently being focused on by the user. Dialog boxes for setting parameters associated with edited accounts such as allowed values for dimensions or date ranges may be presented upon indication by the user to edit those.

The user is enabled to create/modify/delete accounts and associated dimension combinations. The accounts and their combinations may be validated against predefined account rules at operation 1130. The user may also be enabled to edit (add/modify/delete) the predefined account rules through the controls on the account configuration UI. Additionally, the user may be enabled to set permissions for other users to be able to edit a portion of or the whole account structure based on credentials of the other users.

The validation may be performed real time and the user notified if a violation is detected. Alternatively, the validation may be performed upon user indication. The notification is performed at operation 1140, which is followed by activation of the account structure for use by other users of the financial system at operation 1150. The activation request may also be interpreted by the system as an indication by the user to validate the edited account structure(s). Furthermore, the account structure(s) may be rendered inaccessible or otherwise inactive while the user is editing them.

The operations included in process 1100 are for illustration purposes. Providing a user interface for account structure creation and modification may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed in a computing device for providing an account configuration user interface in a financial system, the method comprising:

receiving a user request for editing an account structure through the account configuration user interface provided by a processor of the computing device;

enabling the user to edit the account structure in a graphical, single view user interface by presenting accounts and dimension combinations associated with the accounts in a tree structure through a display device associated with the computing device;

enabling the user to focus on one or more particular elements of the account structure in the graphical, single view user interface, wherein the dimension combinations and at least a portion of controls associated with the dimension combinations are repositioned based on an account structure element currently being focused on;

enabling the user to edit the account structure by defining dimensions, combining the dimensions with the accounts, and setting rules for when the dimension combinations are applied;

validating user edited accounts and dimension combinations against predefined account rules at an account chart edit module executed by the processor;

notifying the user about validation results through the account configuration user interface provided by the processor;

enabling the user to activate the account structure such that it is available for use by other users of the financial system through the account configuration user interface provided by the processor;

providing a relational chart of the user edited accounts including a listing of the user edited accounts associated with a general ledger of the financial system, through the account configuration user interface, wherein the accounts are listed in one or more instances in the relational chart with one or more dimension combinations; and providing at least one of a modification, a creation and a deletion of the dimension combinations using standard functions including a copy, a paste, a delete, and a move to set up and modify the account structure.

2. The method of claim 1, wherein the dimension combinations are displayed as rows with dimensions of same type being aligned in a column.

3. The method of claim 2, wherein a plurality of dimension combinations associated with an account is displayed employing a graphical scheme such that a parent-child relationship between the account and the associated plurality of dimension combinations is visually presented to the user.

4. The method of claim 1, further comprising:
presenting a plurality of account structures in one of: separate windows and separate tab views displayed within the account configuration user interface.

5. The method of claim 4, further comprising:
presenting a plurality of graphical and textual controls for editing presented account structures in the account configuration user interface.

6. The method of claim 4, further comprising:
presenting a plurality of graphical and textual controls for editing presented account structures in one of: the individual windows and the individual tab views.

7. The method of claim 1, further comprising:
enabling the user to edit predefined account rules; and
enabling the user to validate the edited account structure based on the edited account rules.

8. The method of claim 1, further comprising:
providing at least one from a set of: a color scheme, a shading scheme, and a textual style scheme to indicate an element of the account structure currently being focused on by the user.

9. The method of claim 8, further comprising:
modifying a presentation of controls for editing account structure elements based on the element of the account structure currently being focused on by the user.

10. The method of claim 1, wherein the account structure is placed in an inactive mode during editing by the user preventing other users of the financial system from entering new data to the accounting structure.

11. A computing device for providing an account configuration user interface in a financial system, the computing device comprising:
a display device;
a memory; and
a processor coupled to the memory, the processor executing a financial application configured to:
in response to receiving a user request for editing an account structure, display the account configuration user interface in a single view presenting accounts and dimension combinations associated with the accounts in a tree structure and matrix combination format;
enable the user to edit the account structure through graphical and textual controls presented through the account configuration user interface such that focus is placed on one or more particular elements of the account structure;
enable the user to edit the account structure by defining dimensions, combining the dimensions with the accounts, and setting rules for when the dimension combinations are applied;
validate user edited accounts and dimension combinations against predefined account rules;
notify the user about validation results;
enable the user to activate the account structure such that it is available for use by other users of the financial system;
enable the user to set permissions for at least one other user of the financial system to be able to edit at least a portion of the account structure based on credentials of the at least one other user;
display the user edited accounts as rows related in a tree structure reflecting a hierarchic relationship of the user edited accounts, wherein the hierarchic relationship is expanded or collapsed; and
display an active range of each of the dimension combinations next to each of the dimension combinations.

12. The computing device of claim 11, wherein the financial application is further configured to:
display additional information associated with the user edited accounts and dimension combinations through at least one of textual means and graphical means.

13. The computing device of claim 12, wherein the additional information includes at least one of: an active date range for each dimension combination and a validation violation alert.

14. The computing device of claim 11, wherein different dimension types are displayed in distinct columns employing a graphical scheme and a dimension combination currently being focused on by the user is highlighted through another graphical scheme such that the user is provided visual affordance into possible configurations of the account structure.

15. The computing device claim 11, wherein at least a portion of the controls are repositioned based on an account structure element currently being focused on by the user.

16. The computing device of claim 11, wherein the financial application is further configured to:
enable the user to preview an edited account structure in active mode through one of the controls.

17. A computer-readable memory device having instructions stored thereon for providing an account configuration user interface in a financial system, the instructions comprising:
displaying the account configuration user interface in a single view, wherein presenting accounts and dimension combinations associated with the accounts are presented in a tree structure and matrix combination format in response to receiving a user request for editing an account structure;
enabling the user to edit the account structure through graphical and textual controls presented through the account configuration user interface, wherein textual and graphical schemes are employed to present elements of the account structure in a visually coherent manner;
enabling the user to edit the account structure by defining dimensions, combining the dimensions with the accounts, and setting rules for when the dimension combinations are applied;
displaying additional information associated with edited account structure elements;
validating user edited accounts and dimension combinations against predefined account rules based on one of: a user request and an automatic validation rule;
notifying the user about validation results, wherein an alert indicator, textual or graphical, is employed to provide alerts to the user regarding user edited accounts and dimension combinations with account rule violations;
enabling the user to activate the account structure such that it is available for use by other users of the financial system;

providing a relational chart of the user edited accounts including a listing of the user edited accounts associated with a general ledger of the financial system, through the graphical user interface;

providing one of a modification, a creation and a deletion of the dimension combinations using standard functions including a copy, a paste, a delete, and a move to set up and modify the account structure;

displaying the user edited accounts as rows related in a tree structure reflecting a hierarchic relationship of the user edited accounts, wherein the hierarchic relationship is expanded or collapsed for viewing simplicity; and displaying an active range of each of the dimension combinations next to each of the dimension combinations.

18. The computer-readable memory device of claim 17, wherein the instructions further comprise:

presenting a dialog box for defining parameters associated with the user edited accounts to the user in response to an edit request.

19. The computer-readable memory device of claim 18, wherein the dialog box is for defining at least one of: allowed values for a selected dimension and an active date range for a dimension combination.

20. The computer-readable memory device of claim 17, wherein the instructions further comprise:

enabling the user to set permissions for at least one other user to be able to edit at least a portion of the account structure based on credentials of the at least one other user.

\* \* \* \* \*